United States Patent [19]

Fagundes et al.

[11] 4,241,653
[45] Dec. 30, 1980

[54] BANK OUT MODULE BUILDER WITH UNLOADING MECHANISM

[76] Inventors: John L. Fagundes, 8576 Fargo Ave., Hanford, Calif. 93230; Clyde L. Taylor, 1545 Chenowith Ave., Visalia, Calif. 93277

[21] Appl. No.: 11,484

[22] Filed: Feb. 12, 1979

Related U.S. Application Data

[63] Continuation-in-part of Ser. No. 953,071, Oct. 20, 1978, abandoned.

[51] Int. Cl.³ .............................................. B30B 9/30
[52] U.S. Cl. .................................. 100/100; 100/218; 100/226; 100/269R; 100/255; 414/528
[58] Field of Search .......... 100/100, 218, 226, 269 R, 100/255; 56/344, 345, 346; 214/9, 82, 519, 522; 414/528

[56] References Cited

U.S. PATENT DOCUMENTS

| | | | |
|---|---|---|---|
| 1,126,073 | 1/1915 | Peterson | 100/218 X |
| 3,779,158 | 12/1973 | Adee | 100/218 X |
| 3,961,572 | 6/1976 | Johnston | 100/100 X |

*Primary Examiner*—Billy J. Wilhite

*Attorney, Agent, or Firm*—Flehr, Hohbach, Test, Albritton & Herbert

[57] ABSTRACT

Bank out module builder with unloading mechanism having a generally rectangular framework formed by spaced apart sidewalls and spaced apart front and rear walls with the top and bottom being open, the rear wall being formed by a door being movable between open and closed positions. Ground engaging wheels are carried by the framework to facilitate movement of the framework over the ground. A bottom structure is secured within the lower extremity of the rectangular framework for closing the bottom side. A carriage is mounted in the framework for movement longitudinally along the framework between the front and rear walls. A tramper mechanism is carried by the carriage and is movable vertically in the rectangular framework for tramping material introduced into the rectangular framework through the top side to form a module within the rectangular framework. An unloading mechanism carried by the framework for moving the module which is formed within the rectangular framework out through the rear side of the rectangular framework after the door has been moved to an open position.

12 Claims, 10 Drawing Figures

BANK OUT MODULE BUILDER WITH UNLOADING MECHANISM

CROSS REFERENCE TO RELATED APPLICATIONS

This application is a continuation-in-part of application Ser. No. 953,071 filed on Oct. 20, 1978, now abandoned.

BACKGROUND OF THE INVENTION

Module builders have heretofore been provided, as for example shown in U.S. Pat. No. 3,961,572. With such a module builder it has been common practice to position the module builder at one end of the field and to have the cotton pickers picking cotton to travel to the module builder and dump the picked seed cotton into the module builder. The seed cotton is tramped in the module builder by the mechanical tramper and after the module has been formed, the module builder is raised up from the module and advanced off the module to a new location where the next module is to be formed. It has been found that the use of such a module builder in certain situations has a number of disadvantages. For example, in large fields where the capacity of the basket on the cotton picker is insufficient to permit the cotton picker to advance all the way through the field before refilling the basket, it has been necessary for a cotton picker to stop picking and to carry the cotton to the module builder and then to return to the same location to finish picking those rows of cotton. In addition, such an arrangement has made it necessary to form the modules in undesirable locations in order to make them more accessible to the cotton pickers. There is therefore need for a new and improved module builder which overcomes these disadvantages.

SUMMARY OF THE INVENTION

The bank out module builder with unloading mechanism consists of a generally rectangular framework having spaced apart sidewalls and spaced apart front and rear walls with the top and bottom being open. The bottom framework is secured within the lower extremity of the rectangular framework for closing the bottom side. A carriage is mounted on the generally rectangular framework for movement longitudinally of the generally rectangular framework between the front and rear walls. A tramper mechanism is carried by the carriage and is movable vertically within the framework for compacting material introduced in through the top side of the generally rectangular framework. Ground engaging wheels are carried by the generally rectangular framework to permit movement of the module builder from one location to another. The rear side of the rectangular framework is formed by a door movable between open and closed positions. Means is carried within the framework for moving the material which is within the rectangular framework out through the rear of the rectangular framework for unloading the module builder.

In general, it is an object of the present invention to provide a bank out module builder with unloading mechanism to permit the module builder to travel to the cotton picker rather than having the cotton picker travel to the module builder.

Another object of the invention is to provide a module builder of the above character in which the modules which are formed in the module builder can be unloaded from the module builder.

Another object of the invention is to provide a module builder of the above character which permits the module to be deposited in the best location in the field.

Another object of the invention is to provide a module builder of the above character of such a size that it can be readily picked up by conventional means and transported to the gin or other locations.

Additional objects and features of the invention will appear from the following description in which the preferred embodiments are set forth in conjunction with the drawings.

DESCRIPTION OF THE PREFERRED EMBODIMENTS

Figure 1:
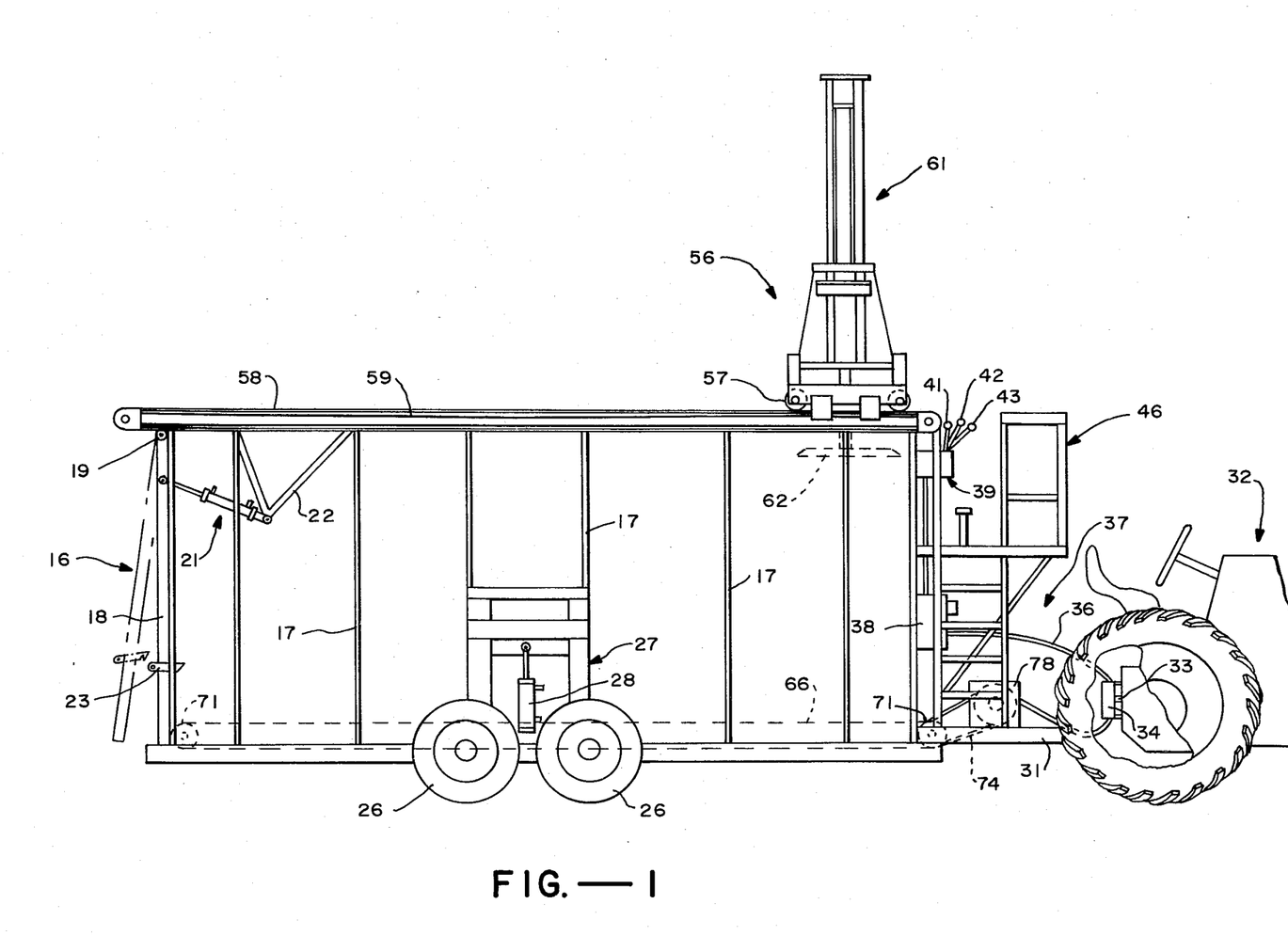
FIG. 1 is a side elevational view of a bank out module builder with unloading mechanism incorporating the present invention.
Figure 2:
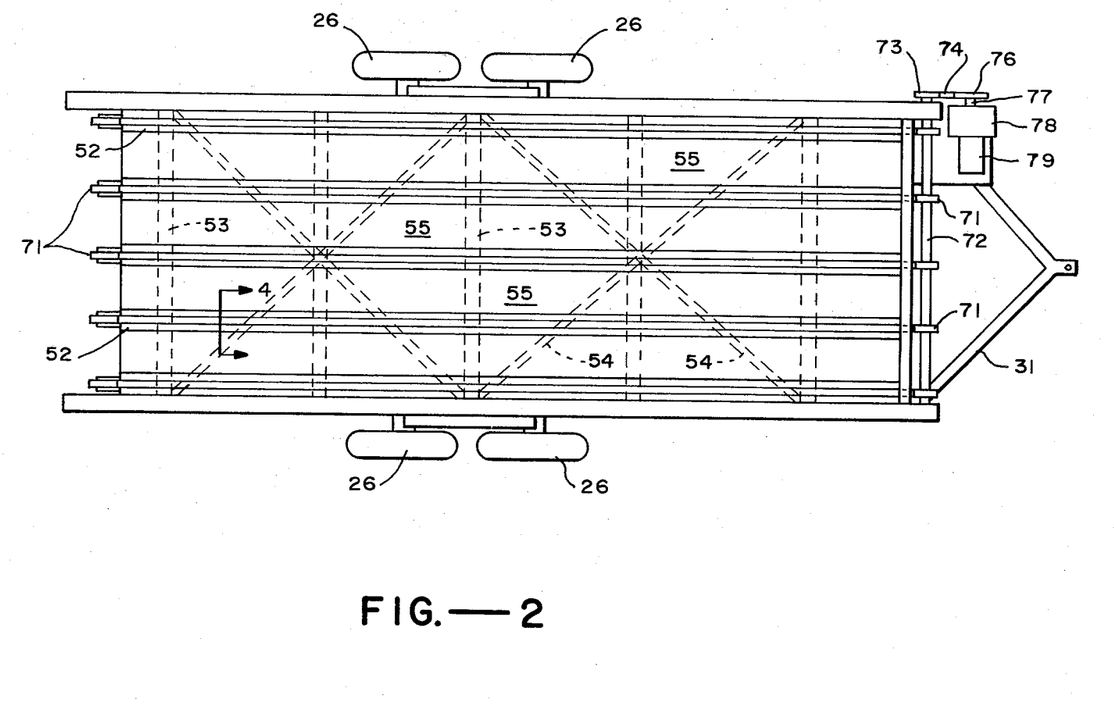
FIG. 2 is a top plan view of the module builder as shown in FIG. 1.

As shown in FIG. 1, the bank out module builder with unloading mechanism consists of a generally rectangular framework 11 having spaced apart sidewalls 12 and 13 and spaced apart front and rear walls 14 and 16. Vertically extending gussets 17 are provided on the sidewalls 12 and 13 for reinforcing the same. As can be seen particularly from FIG. 3, the sidewalls 12 and 13 are provided with planar tapered portions 12a and 13a which are inclined downwardly and outwardly and with top flared portions 12b and 13b which are inclined upwardly and outwardly. The side walls 12 and 13 are also tapered outwardly to the rear as for example four inches in sixteen feet. The front wall 14 is generally vertical.

The rear wall 16 is formed by a door 18 movable between open and closed positions. The door as shown in FIG. 1 is hinged at 19 for pivotal movement about a horizontal axis which is generally coincident with the top extremity of the generally rectangular framework 11. Means is provided for moving the door 18 between the open and closed positions and consists of a pair of hydraulic rams 21 provided on opposite sides of the rectangular framework and having one end pivotally connected to a framework 22 carried by the sidewalls 12 and 13. A latching mechanism 23 is provided for retaining the door in the closed position during the time that the module is being formed as hereinafter described.

Ground engaging wheels 26 are carried by the generally rectangular framework and are in the form of a pair of wheels 26 provided on each side of the generally rectangular framework which are carried by a conventional walking beam 27. A hydraulic actuator 28 is provided for each pair of wheels on each side of the generally rectangular framework for causing movement of the ground engaging wheels 26 vertically with respect to generally rectangular framework 11 so as to permit the framework 11 to be raised and lowered with respect to the ground. The ground engaging wheels 26 are provided to permit movement of the module builder from one location to the other. The module builder to permit such movement is provided with a draw bar 31 which can be attached to a vehicle as for example a tractor 32 as shown in FIG. 1.

Figure 10:
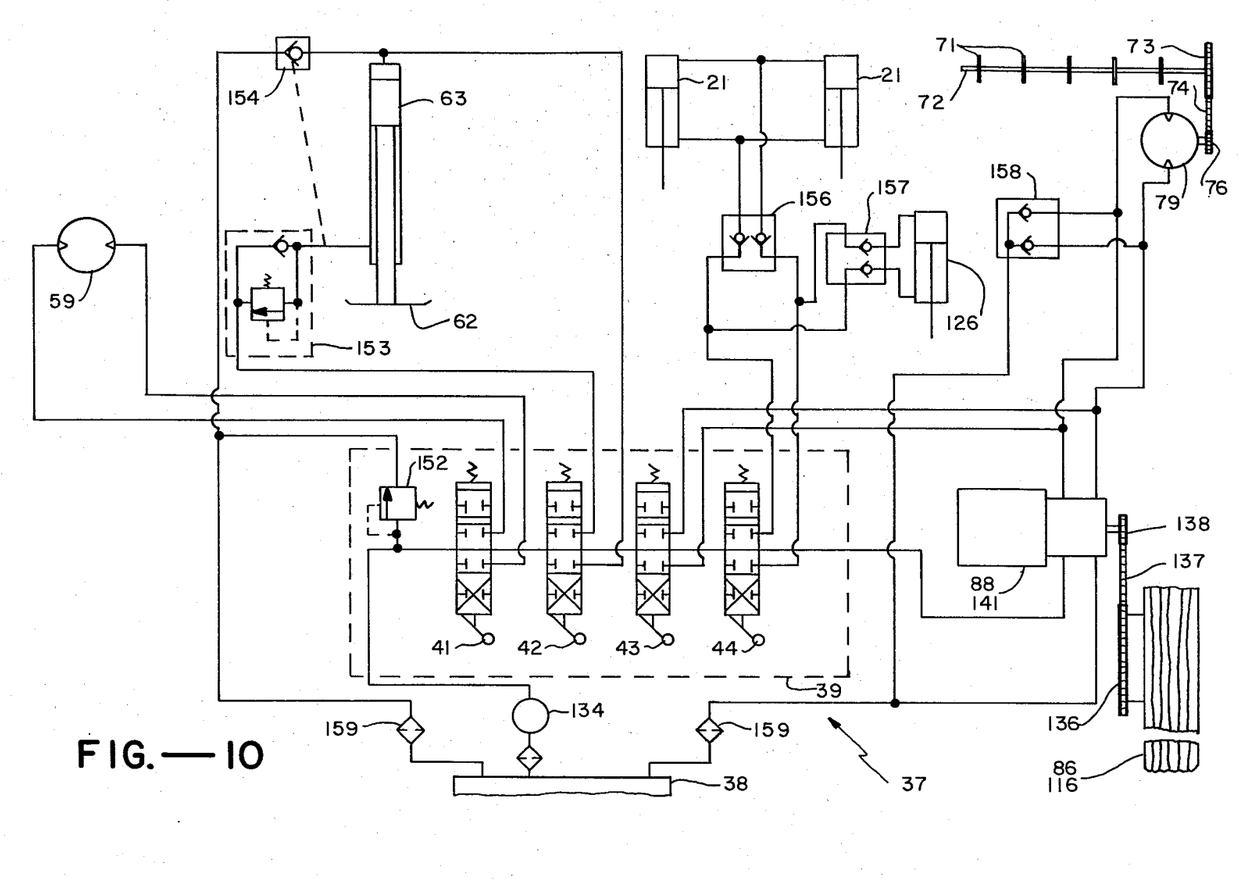
FIG. 10 is a schematic diagram of the hydraulic system utilized in the bank out module builders of the present invention.

As is well known to those skilled in the art, such a tractor is provided with a power takeoff which has an output shaft 33. A hydraulic pump 34 is mounted directly upon the power takeoff shaft 33 and is driven thereby. The pump 34 is connected by flexible piping in the form of hoses 36 to a hydraulic system 37 of a conventional type as shown in FIG. 10 which is mounted on the rectangular framework 11. The hydraulic system includes a storage tank 38 and a control assembly 39 which is provided with three control levers 41, 42 and 43 and 44 for controlling operation of the hydraulic system as hereinafter described. An operator's platform 46 is mounted on the rectangular framework 11 and the front extremity of the same so as to give the operator ready access to the control levers 41, 42, 43 and 44.

A bottom wall structure 51 is provided for closing the bottom side of the rectangular framework and consists of a plurality of spaced apart parallel box beam members 52 which extend longitudinally of and are parallel to the sidewalls 12 and 13. The box beam members 52 are mounted on cross members 53 which are secured to the lower extremity of the rectangular framework 11. Additional diagonal bracing 54 is also provided. Sheetlike plates 55 extend between the box beam members 52 generally flush with the upper extremities thereof.

A carriage 56 is mounted upon the rectangular framework for movement longitudinally of the framework between the front and rear walls. The carriage is of a conventional type and is provided with wheels 57 which travel on U-shaped channel members 58 secured to the top extremities of the sidewalls 12 and 13. Means is provided for causing movement of the carriage 56 longitudinally of the framework 11 and consists of chains 59 carried within the channel members 58 and which are adapted to be driven by a hydraulic motor 59 (see FIG. 10). The hydraulic motor 59 is adapted to be controlled by the control lever 41 to thereby control the movement of the carriage from the front to the rear of the rectangular framework 11.

A tramper mechanism 61 of a conventional type is mounted upon the carriage 56. The tramper mechanism includes a tramper 62 which is disposed within the rectangular framework 11 and which extends between the sidewalls 12 and 13. The tramper 62 is movable between raised and lowered positions in the framework 11 by a hydraulic ram 63 under the control of the control lever 42 so that the operator of the module builder can control the raising and lowering of the hydraulic ram 62 while controlling the traversing movement of the carriage 56. The carriage 56 and the tramper mechanism 61 are of conventional types and, for example, can be constructed in the manner disclosed in U.S. Pat. No. 3,961,572.

Figure 3:
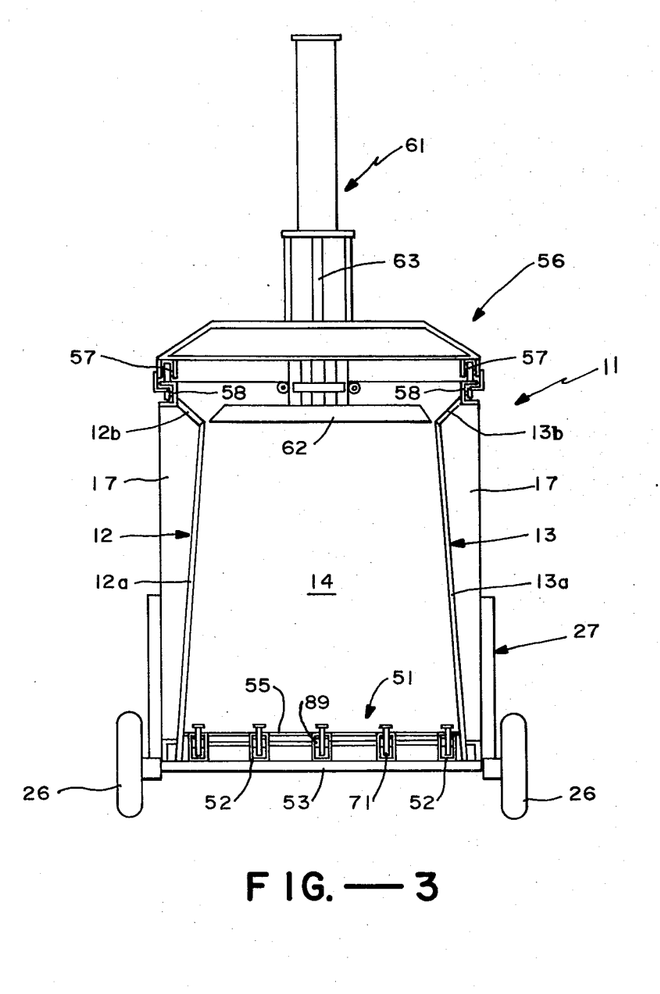
FIG. 3 is a rear elevational view of the module builder shown in FIGS. 1 and 2.
Figure 4:
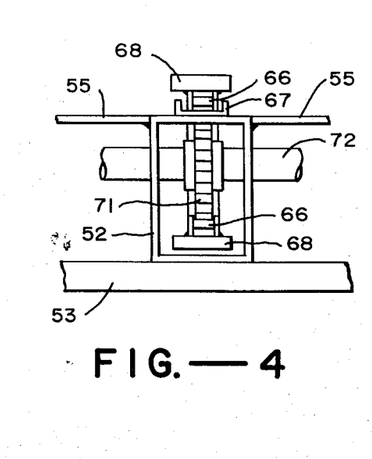
FIG. 4 is a cross sectional view taken along the line 4—4 of FIG. 2.

As is well known to those skilled in the art, cotton modules can be formed within the rectangular framework 11 upon the bottom wall structure 51. Means is provided within the framework 11 for discharging from the module builder any module which has been formed within the rectangular framework 11. As is shown in FIG. 3, such means consists of a plurality of endless chains 66, the lower runs of which travel within the box beam members 52 and the upper run which travels on U-shaped channels mounted on the top of the box beam members 52 (see FIG. 4). The endless chains 66 have mounted thereon cross pieces 68 which are special longitudinals of the chains 66. The cross pieces 68 are U-shaped in cross section. The chains 66 are carried by sprockets 71 rotatably mounted on the extreme ends of the box beam members 52. The sprockets 71 at the front of the rectangular framework 11 are mounted upon common shaft 72. A driven sprocket 73 is mounted on the shaft 72 and is driven by a chain 74. The chain 74 is driven by a sprocket 76 mounted upon the output shaft of a gear reducer 78. The gear reducer 78 is driven by a hydraulic motor 79 which is under the control of control lever 43. The sprockets 71 at the rear of the framework 11 are mounted upon stub shafts 89. The hydraulic cylinders 21 for the door 18 are controlled by the control lever 44.

Operation and use of the bank out module builder with unloading mechanism will now be briefly described as follows. The module builder of the present invention is particularly adapted for use in bank out operations in which the module builder can be pulled by the tractor to be moved to various positions in the field to get material which is to be formed into modules within the module builder. Thus by way of example, the module builder is moved into the fields to meet the cotton picker when the basket carried by the cotton picker reaches a nearly filled position. Depending upon the height of the basket of the cotton picker above the ground and the height of the module builder it may be necessary to lower the module builder closer to the ground to give the necessary clearance. If this is the case, the operator, after advancing to the desired position, by an additional control valve (not shown) can lower the module builder to the ground or in closer proximity to the ground. Then the cotton picker can advance so that its basket extends over the module builder. The operator of the cotton picker can then dump the basket into the module builder. The operator of the module builder then operates the control levers 41 and 42 of the module builder to tramp the seed cotton which has been dumped into the rectangular frame 11 in a conventional manner by causing the carriage 56 to move longitudinally of the framework and at the same time or independently to cause the operation of the tramper mechanism to cause tramping and/or distribution of the seed cotton which has been dumped into the module builder. As soon as this has been completed, the module builder can be taken to the next cotton picker to pick up seed cotton from it and compact the same within the module builder. This operation is continued until sufficient cotton has been received and tramped within the rectangular framework 11 to form a module of the desired size. Heretofore it has been the practice to build the module builders of a sufficient length so that the modules formed therein have a length as for example thirty two feet. Such modules have been stored in the field and have subsequently thereafter been picked up by module movers for movement of the seed cotton modules to the gin.

In connection with the present invention, the decision was made to make the module builder of a smaller size to facilitate its maneuverability and movement in the field to and from the cotton pickers. For this reason, a length was chosen of sixteen feet, which is one-half the conventional size formed by the stationary module builders heretofore utilized. By utilizing a sixteen foot module as hereinafter described, two of these sixteen foot modules can be moved by a conventional module mover.

When a module has been formed in the module builder of the present invention, the module builder is moved to the location where it is desired to store the modules in the field. Since this is the case, the best location in the field, such as for example, the highest ground can be chosen for the modules without the necessity of having the cotton pickers travel a long distance to dump their loads. When the module modules without the necessity of having the cotton pickers travel a long distance to dump their loads. When the module mover has been moved to the desired location, the rectangular framework can be lowered from a position which is on the ground to a position which is slightly above the ground. The operator then operates the control lever 44 to actuate the hydraulic rams 21 for opening the rear door and moves it to the open position. Thereafter, the control lever 43 is operated to operate the chain drive which causes the module which has been formed therein to be discharged through the rear side of the rectangular framework 11. The widening of the spacing in a rearward direction between the sidewalls 12 and 13 facilitates discharge of the module. As the module is being discharged from the rectangular framework 11, it will come into engagement with the ground at the rear of the module builder. As soon as there has been sufficient engagement with the ground, the further discharge of the module from the module builder may cause the module builder itself with the tractor to be advanced as the module is discharged from the module builder. As soon as the module has been discharged from the module builder, the tractor can be advanced to pull the module builder away from the module, the rear door 16 can be closed, and the module builder can be raised and then transported out into the field to pick up the next loads of seed cotton from the cotton pickers and the same procedure carried out. Thus it can be seen that there has been provided a module builder which can be utilized for bank out purposes for collecting seed cotton from the cotton pickers, tramping it into modules in the field and then delivering the modules to a desired site for storage from which they can be transported to the cotton gin for ginning in a conventional manner.

By the use of a hydraulic pump 34 which is connected to the power takeoff of the tractor and having a flexible piping between the pump and the module builder the rear extremity of the module builder can tip downwardly to thereby provide an inclination to facilitate the unloading of the seed cotton module from the module builder. The flexible hoses readily accommodate any vertical movement which may occur with respect to the front extremity of the module builder.

Figure 5:
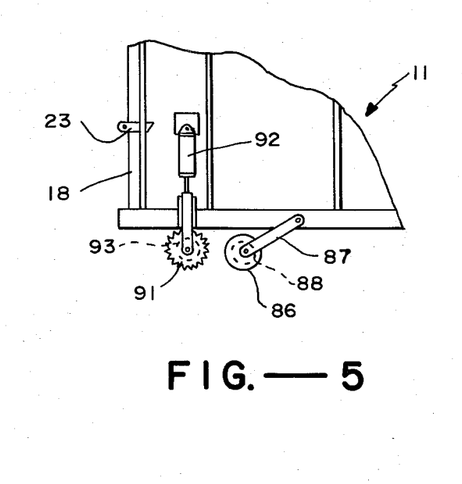
FIG. 5 is a partial side elevational view showing ground engaging wheels used for synchronizing certain operations of the module builder.

In order to facilitate the unloading operation, additional hydraulic means may be provided as seen in FIGS. 5 and 10. There is provided a ground engaging wheel 86 which is carried by a pivotally mounted arm 87 mounted upon the bottom wall structure 51. The wheel 86 drives a hydraulic servo motor 88 the output of which is connected to the hydraulic motor 79 for driving the chains 66 so that the movement of the unloading chain is synchronized with the movement of the module maker. In addition to facilitate movement of the module maker during unloading of the module from the module maker, toothed ground engaging rollers 91 are provided on opposite sides of the rectangular framework 11. These rollers 91 can be raised and lowered by hydraulic actuators 92 by the use of a control valve (not shown). The rollers 91 are provided with hydraulic motors 93 which can be connected in parallel with the motor 79 so that they can be powered under the control of the servo motor 88 controlled by the wheel 86 to cause powered advancement of the module builder in synchronization with the movement of the module out of the module builder during the unloading operation. This is advantageous in that it will ensure that the modules can be readily unloaded from the module builder without danger of splitting or breaking apart of the module.

Figures 6, 7, 8, 9:
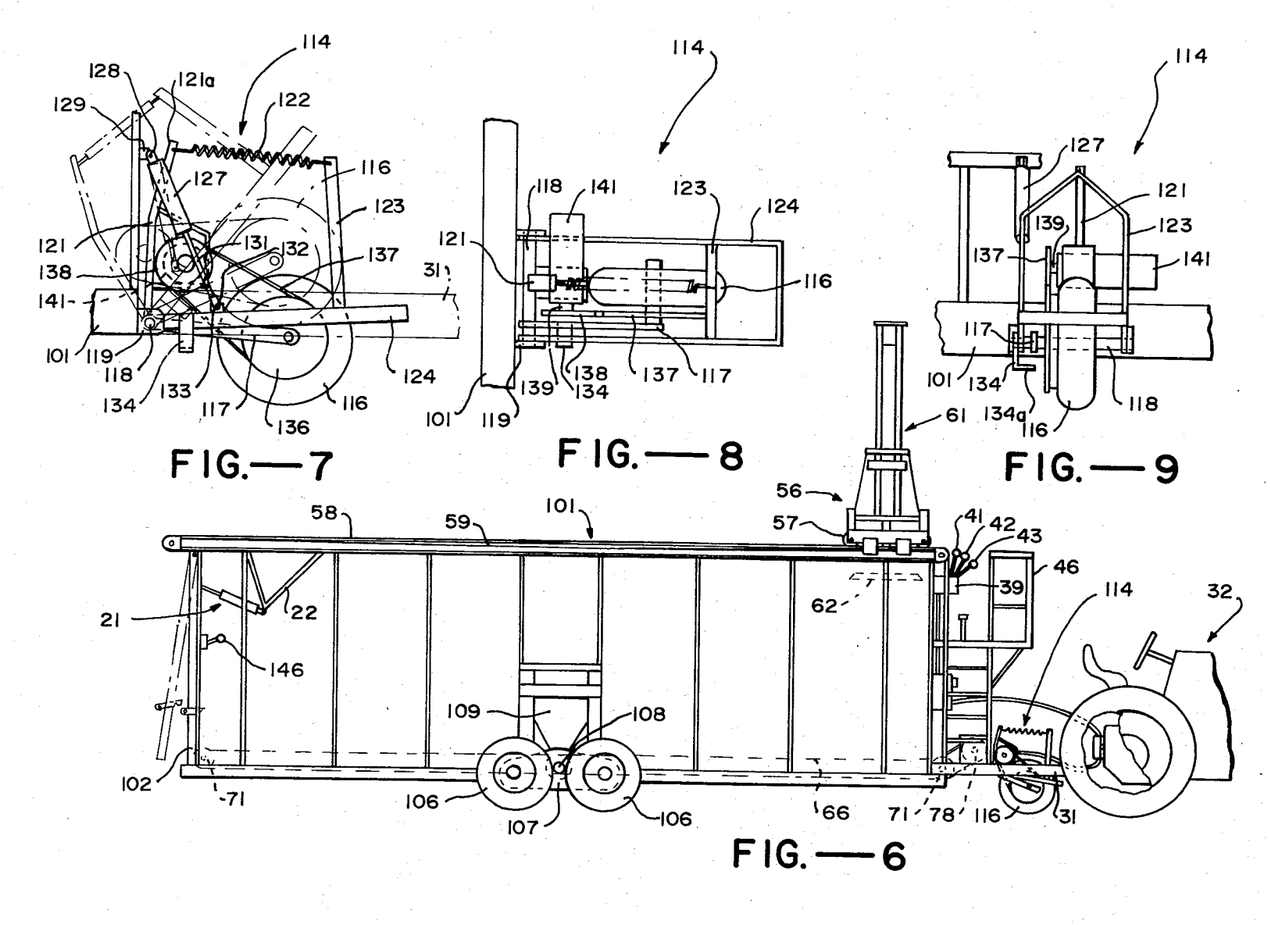
FIG. 6 is a side elevational view of another bank out module builder incorporating the present invention.
FIG. 7 is an enlarged partial view of the bank out module builder shown in FIG. 6 and showing in particular a portion of the hydraulic mechanism utilized for synchronizing unloading of the module from the module builder.
FIG. 8 is a top plan view of the mechanism shown in FIG. 7.
FIG. 9 is a front elevational view of the hydraulic mechanism shown in FIG. 7.

Another embodiment of the bank out module builder with unloading mechanisn is shown in FIG. 6. It consists of a generally rectangular framework 101 which is very similar to the framework 11 shown in FIG. 1 with the exception that it is twice the length of the framework shown in FIG. 1 so that instead of forming a module which is sixteen feet in length as is possible with the embodiment shown in FIG. 1, a module of thirty-two feet in length is formed with the framework 101 shown in FIG. 6. It is provided with a rear door 102 substantially identical to the door 18 provided in FIG. 1. The door is movable between open and closed positions in the same manner as the door 18. Ground engaging wheels 106 are carried by the framework 101 and are rotatably mounted upon a walking beam 107. The walking beam 107 is pivotally mounted on a stub shaft 108 carried by a support bracket 109. Thus in this embodiment of the bank out module builder as shown in FIG. 10 no means is provided for raising and lowering of the wheels 106 with respect to the frame. As hereinafter described, it has been found unnecessary to raise and lower the wheels with respect to the framework during unloading of the module from the module builder. A carriage 56 and a tramper mechanism 61 of the type described in conjunction with FIG. 1 is also utilized in conjunction with the embodiment shown in FIG. 6. Also as in the embodiment shown in FIG. 1, endless chains 66 travel on box beam members (not shown) forming a part of the bottom wall structure closing the bottom side of the framework 101. The chains 66 rather than being driven by single gear reducer 78 and hydraulic motor 79 because of the increased length of the framework 101 are driven by a pair of gear reducers 78 and hydraulic motors 79 with one being mounted on each side of the front of the framework 101.

In conjunction with the embodiment shown in FIG. 1, there was described additional hydraulic means which was provided to synchronize the movement of the framework with the unloading of the module from the module builder. Similarly in the embodiment shown in FIG. 6, there is provided additional hydraulic means for controlling the unloading of the module from the module builder in synchronism with the movement of the module builder during the unloading operation. This is accomplished by a hydraulic mechanism 114 shown particularly in FIGS. 7 and 8 consisting of a rubber-tired ground engaging wheel 116 which is rotatably mounted on an arm 117 that is pivotally mounted upon a shaft 118. The shaft 118 is pivotally mounted in ears 119 secured to the framework 101. An upstanding member 121 has its lower extremity secured to the shaft 118 by suitable means such as welding so it moves in unison with the arm 117. The upstanding member 121 is provided with a portion 121a which is inclined upwardly and forwardly. A coil spring 122 has one end secured to the upper extremity of the upstanding member 121 and has the other end secured to a vertical extending generally U-shaped member 123. The lower extremities of the U-shaped member 123 are secured to another horizontally extending generally U-shaped member 124 which extends rearwardly and is pivotally mounted upon the shaft 118. Means is provided for pivoting the U-shaped member 124 upwardly and downwardly about the axis formed by the shaft 118 to move the wheel 116 into engagement with the ground as shown in solid lines and an out-of-the-way position as shown in broken lines in FIG. 7 and consists of a hydraulic actuator 126. The cylinder 127 of the hydraulic actuator 126 is pivotally connected by a pin 128 to an ear 129 provided on the framework 101. The piston rod 131 of the hydraulic actuator 126 is pivotally connected by a pin 132 to an ear 133 provided on the framework 124. The U-shaped member 124 has mounted thereon an L-shaped bracket 134 having one leg 134a underlying the arm 117 so that when the member 124 is raised beyond a predetermined distance, the bracket 134 will engage the arm 117 to raise it and the wheel 116 so that the wheel 116 can be moved to the out-of-the-way position shown in broken lines in FIG. 7.

A sprocket wheel 136 is mounted on the ground engaging wheel 116 and rotates therewith. It drives a chain 137. The chain 137 drives a sprocket wheel 138 which is mounted on the input shaft 139 of a hydraulic motor 141. The hydraulic motor 141 is of a conventional type typically used in power steering applications and provides a hydraulic fluid output which is proportional to the speed of rotation of the input shaft and has its output connected to two of the hydraulic motors 79 hereinbefore described which are utilized for advancing the endless chains 66 provided within the framework 101. A control valve lever 44 is mounted at the rear door and controls the flow of hydraulic fluid through piping (not shown) to control the operation of the hydraulic actuator 21 for the rear door and also for the hydraulic actuator 126 for the hydraulic mechanism 114. The control valve 43 is connected to the hydraulic piping so that it serves as an override valve so that if desired the motors 79 can be operated under manual control.

Operation of the embodiment of the bank out module builder shown in FIG. 6 is substantially identical to that hereinbefore described with respect to the bank-out module builder shown in FIG. 1. Let it be assumed that the module builder has been filled with cotton in the field and that a module has been formed in the framework 101 and that it is now desired to unload the same. During the time that the module builder is being filled and moved, the wheel 116 is maintained in its raised out-of-the-way position so that it cannot accidentally come into contact with the ground during these filling and moving operations of the module builder. Assuming that the module builder is in the desired location to unload the module, the operator on the tractor operates the three-point hitch 31 to raise it sufficiently far so that the front end of the module builder is lifted so that the rear end of the module builder is brought into close proximity to the ground. This tilting movement of the framework 101 is readily accommodated by the ground engaging wheels 106 carried by the framework 101 since they are mounted upon the pivotally mounted walking beam 107. This also facilitates unloading of the module because the rear extremity of the framework is brought closer to the ground. Thus it can be seen that it is unnecessary to provide means to permit raising and lowering of the ground engaging wheels 106 with respect to the framework 101. The operator then moves to the rear of the module builder to see that it is clear and then operates the control lever 44 which is connected to supply hydraulic fluid to the hydraulic actuators 21 and simultaneously to the hydraulic actuator 126 to open the door 102 and to simultaneously lower the wheel 116 into engagement with the ground.

Operation of the hydraulic actuator 127 extends the piston rod 131 to move the U-shaped member 124 downwardly. As the U-shaped member 124 is moved downwardly, it causes the U-shaped member 123 to also move downwardly and to tension the spring 122. Tensioning of the spring 122 applies a yieldable force to the upstanding member 121 which applies a yieldable force to the ground engaging wheel 116 to ensure that it is in firm frictional engagement with the ground. Thus it can be seen that yieldable means in the form of spring 122 is provided for yieldably urging the wheel 116 into engagement with the ground over which the module builder is to travel.

The tractor 32 is next placed into gear by the operator to slowly advance the module builder. As the modulebuilder is advanced, the ground engaging wheel 116 causes driving of the motor 141. As the motor 141 is driven as is well known to those skilled in the art, hydraulic fluid is permitted to pass through the same to the motors 79 to operate the same to cause the endless chain 66 to be advanced to move the module which has been formed in the module builder through the rear opening of the framework 101. The movement of the endless chain 66 is synchronized with the movement of the module builder by the tractor 32 by use of the ground engaging wheel 116 which drives the motor 141 at a speed which is directly proportional to the speed of travel of the module builder over the ground thus synchronizing the movement of the cottom module out of the module builder. This will ensure that the relatively long modules can be readily and easily unloaded without any danger of the module breaking apart.

In FIG. 10 there are shown certain additional components not hereinbefore described which are conventional in the hydraulic systems of this type. For example, the system includes a screen or filter 151 which filters the hydraulic fluid as applied from the tank 38 to the pump 34. It also includes a conventional pressure relief valve 152. For the operation of the cylinder 63 for the tramper 62 there is provided a conventional counter-balance valve 153 and a pilot operated relief check valve 154. For the hydraulic actuators 21 there are provided lock valves 156 which will ensure that when the hydraulic actuators are moved to the desired positions they will be locked in those positions. Thus, when the door 16 is moved to an open position it will remain in an open position.

Similarly, there are provided lock valves 157 which are associated with the cylinder 126 to ensure that the wheel 116 will be locked in the raised or lowered positions. Also there is also provided a pilot operated check valve 158 which is connected to the hydraulic piping for motor or motors 79. Filters or screens 159 are provided in the return lines to the hydraulic tank 38.

These additional hydraulic components are of a type well known to those skilled in the art and are conventionally used in hydraulic systems. It should be appreciated that although the hydraulic motor 88 or 141 is identified as a motor, it, in effect, serves as a metering valve for metering hydraulic fluid from the pump 34 to the motor or motors 79.

It is apparent from the foregoing that there has been provided a new and improved bank out module builder with an unloading mechanism which makes it possible to travel to and from the cotton picker and to pick up seed cotton from the picker, to form seed cotton modules and to position the modules in the optimum location in the field.

What is claimed is:

1. In a bank out module builder with an unloading mechanism adapted to be drawn by a self propelled vehicle, a generally rectangular framework having an open top side and having spaced apart sidewalls and spaced apart front and rear walls, and a bottom wall structure, the rear being formed by a door movable between open and closed position, and in the open position being raised upwardly to an out-of-the-way position, ground engaging members carried by the framework, a carriage mounted on said framework for movement longitudinally of the framework between the front and rear walls, means carried by the framework for causing movement of said carriage between the front and rear walls, a tramper mechanism carried by the carriage and having a tramper and means for moving said tramper vertically within said framework for forming a module within the framework, means carried within the framework for discharging through the rear of the framework a module formed within the framework and means adapted to form a connection between the bank out module builder and the self propelled vehicle to permit the rear of the framework to tilt downwardly under the weight of the module as the module is moved through the rear of the framework so that the module can readily be moved into close proximity to the ground to the rear of the bank out module builder as it is discharged to minimize any possible break up of the module.

2. A module builder as in claim 1 wherein said means for causing discharge of a module includes a plurality of endless chains extending through the bottom wall structure, sprockets for driving said chains and motor means for driving said sprockets.

3. A module builder as in claim 2 together with means for causing synchronized movement of the chains with the movement of the module builder with respect to the ground.

4. A module builder as in claim 3 together with ground engaging means carried by the rear extremity of the framework and means for powering said ground engaging means in synchronism with the movement of the chains to cause positive movement of the module builder as the module is discharged from the module builder.

5. A module builder as in claim 2 wherein said bottom wall structure includes a plurality of box shaped beam members extending longitudinally of the rectangular framework and wherein the lower runs of the chains travel within the box-shaped beam members and wherein the upper runs of the chains travel on top of the box-shaped beam members.

6. A module builder as in claim 5 together with U-shaped channel members mounted on the box-shaped beam members and wherein the upper runs of the chains travel in the U-shaped channel members.

7. A module builder as in claim 5 wherein said bottom wall structure includes plates extending between the box-shaped beam members.

8. A module builder as in claim 1 wherein the sidewalls are tapered outwardly toward the rear to facilitate discharge of a module.

9. A module builder as in claim 3 together with ground engaging means carried by the framework means coupled to the ground engaging means for driving the motor means for driving said sprockets so that the chains which are used for discharging the module through the rear of the framework are synchronized with the movement of the module builder with respect to the ground.

10. A module builder as in claim 9 together with means mounting said ground engaging means on said framework to permit raising and lowering of the same with respect to the framework.

11. A module builder as in claim 1 together with means for causing synchronized movement of the means carried within the framework for discharging a module with movement of the module builder with respect to the ground.

12. A module builder as in claim 11 wherein said means for causing synchronized movement includes a ground engaging wheel and means for moving the ground engaging wheel between ground engaging and out-of-the-way positions, together with means for moving said door between open and closed positions and means for causing synchronized movement of said ground engaging wheel to a ground engaging position when the door is moved to an open position and an out-of-the-way position when the door is moved to a closed position.

* * * * *